United States Patent Office 3,317,484
Patented May 2, 1967

3,317,484
POLYMERS HAVING RECURRING TRIAZINE RINGS
Charles Gerhard Fritz, Wilmington, and Joseph Leo Warnell, Graylyn Crest, Del., assignors to E. I. du Pont de Nemours and Company, Wilmington, Del., a corporation of Delaware
No Drawing. Filed Nov. 23, 1962, Ser. No. 239,823
22 Claims. (Cl. 260—78.4)

This invention relates to the preparation of certain novel perfluorodinitrile monomers, and to novel perfluorodinitrile polymers and copolymers.

This invention has as its object the formation of easily fabricable resins which have high temperature resistance along with high resistance to corrosive chemicals, and which are good electrical insulators.

It is a further object of this invention to produce such a resin which also has sufficient mechanical strength to form tough non-bristle shaped articles. Another object is to produce a resin having a high heat distortion temperature. Another object of this invention is to produce a monomer from which a resin meeting the above setforth objectives can be made.

These and other objects are accomplished by synthesizing certain perfluoroether-dinitriles which are either homopolymerized or copolymerized with other perfluoroether-dinitriles or perfluorodinitriles having from 2 to 8 carbon atoms between nitrile groups such as perfluorosuberodinitrile. The resulting polymers are either much tougher and less brittle or have a higher heat distortion temperature than those polymers formed from perfluorodinitriles such a perfluoroadipodinitrile or perfluoroglutodinitrile.

The perfluoroether-dinitriles of the present invention have the general structures

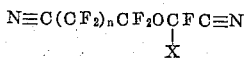

where $n$ is an integer of from 0 to 12,

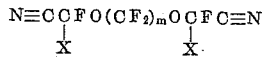

where $m$ is an integer of from 2 to 12,

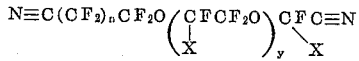

where $y$ is an integer of from 0 to 100, and $n$ is an integer of from 0 to 12, and

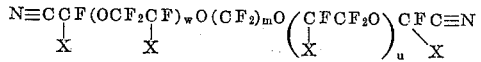

where $m$ is an integer of from 2 to 12, and $u+w$ is an integer from 0 to 100. In each of the above structural formulas X is selected from the group consisting of fluorine and $CF_3$.

These perfluoroether dinitriles can either be homopolymerized or copolymerized with another perfluorodinitrile. The reaction is a trimerizing of the nitrile groups from three dinitriles to form a triazine ring. The general polymeric structure is indicated below, wherein $R_1$, $R_2$, and $R_3$ can be various divalent perfluorocarbon radicals or perfluorocarbon ether radicals,

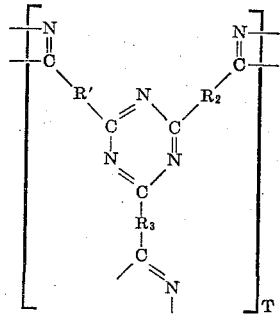

where T is an extremely large number which may be equal to the number of molecules employed. Polymers of similar structure can be made by trimerizing dinitriles such as perfluorosuccinodinitrile; however, such polymers are either brittle or have a low heat distortion temperature and are of little commercial value. By copolymerizing from 1 to 20 weight percent of one of the above-described perfluoroether dinitriles with the perfluorodinitrile derivative of a perfluorodicarboxylic acid having from 4 to 10 atoms a more elastic and tougher polymer can be obtained. It is also possible to greatly improve the temperature resistance properties of polymers of perfluorosuccinodinitrile by copolymerizing therewith from 1 to 20 weight percent of another perfluorodinitrile of a dicarboxylic acid containing from 5 to 8 carbon atoms, or one of the above-described perfluoroether dinitriles.

As shown above, when polymerizing dinitriles, triazine rings are formed. These rings can be linked together in a variety of patterns. The three most probable patterns are as follows where each ring

represents a triazine ring and the links linking the rings represent the chain portion of the particular dinitrile involved:

(A)

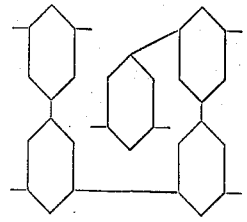

(B)

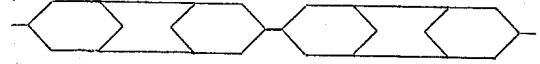

(C)

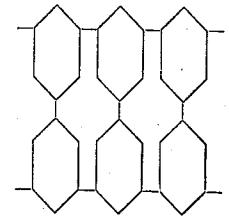

When only structure A is formed the polymer can be expected to be extremely hard, and brittle. Either structure B or C is believed to produce a polymer having strength properties more like the more conventional linear polymers such as polytetrafluoroethylene. It appears from the present invention that by either using a perfluoroether dinitrile alone or in combination with a dinitrile, or in the case of perfluorosuccinodinitrile a small quantity of a perfluorodinitrile of longer chain length than perfluorosuccino dinitrile, structures B and C are formed in sufficient quantity to overcome the brittleness imparted by structure A.

The perfluoroether dinitrile monomers of the present invention are prepared by converting perfluoroether diacyl halides or esters to dinitriles by reacting with ammonia at 25° to 200° C. to give the diamide, which is then converted to the dinitrile by heating at 50 to 250° C. in the presence of phosphorous pentoxide, thionyl chloride or benzotrichloride.

Acid fluorides of the general formula

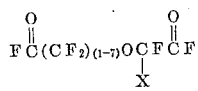

are prepared by reacting a diacid fluoride with tetrafluoroethylene oxide or hexafluoropropylene oxide according to the following equation in which X is either F or $CF_3$.

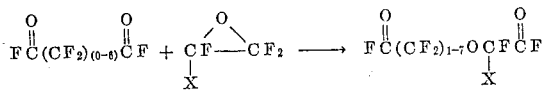

Hexafluoropropylene oxide can be prepared by the alkaline hydrogen peroxide oxidation of hexafluoropropylene. Both hexafluoropropylene oxide and tetrafluoroethylene oxide can be prepared by direct oxidation of the corresponding olefin with oxygen. Perfluoro-diacid fluorides can be obtained by fluorination of the appropriate hydrocarbon acids.

The following examples are illustrative of the invention.

*Example 1*

A slurry of 6 grams of cesium fluoride (0.04 mole) in 60 ml. of acetonitrile and 28 ml. of perfluoroglutaryl fluoride (0.2 mole) was warmed to 40° C. Hexafluoropropylene epoxide was then pressured in at 5 p.s.i.g. After 0.25 mole of the oxide had been absorbed, the addition was discontinued, the heavy fluorocarbon layer removed from the reactor and the products distilled in an anhydrous atmosphere. The product, perfluoro-2-methyl-3-oxasuberyl fluoride, had a boiling point of 101° C. at 760 mm./mercury pressure and was obtained in 92% yield. NMR and IR spectra were consistent with the assigned structure. The acid fluoride was then cooled to 0° C. in a polyethylene container and an excess of methanol was added slowly. The reaction mixture was poured into ice water, the heavy layer separated and washed again with ice water. The conversion to the dimethyl ester with a boiling point of 101° C. at 9 mm./mercury was quantitative. NMR and IR spectra were consistent with the assigned structure of the dimethyl ester of perfluoro-2-methyl-3-oxasuberic acid. A stream of ammonia was passed through a solution of 300 grams of the dimethyl ester of perfluoro-2-methyl-3-oxasuberic acid in 500 ml. of diethyl ether, at 0° C. The reaction was complete after four hours and the ether was partially evaporated and the solid product collected. The diamide had a melting point of 145 to 147° C., and was obtained in nearly quantitative conversion. One hundred and twenty grams of the resulting perfluoro-2-methyl-3-oxasuberamide was dried in a vacuum desiccator over phosphorus pentoxide. The amide was then mixed with 900 grams of phosphorous pentoxide and heated to 190 to 200° C. in a round-bottom flask. After one hour, vacuum was applied, and the product was collected in a Dry Ice trap. Heating under vacuum was continued at 190 to 200° C. for three hours. The product was distilled to get pure perfluoro-2,7-dicyano-3-oxaheptane, having a boiling point of 100° C. at 760 mm./mercury, in 70% yield. NMR and IR spectra were consistent with the assigned structure.

*Example 2*

A slurry of 30 g. of cesium fluoride (0.2 mole) and 54 g. of oxalyl fluoride (0.575 mole) in 50 ml. of diethylene glycol dimethyl ether was cooled to 0° C. One hundred grams (0.6 mole) of hexafluoropropylene oxide was added under 5 p.s.i.g. pressure. After two hours, when the reaction was complete, an excess of methanol was slowly added to the reaction mixture. The product ester and the diethylene glycol dimethyl ether were poured into ice water; the heavy fluorocarbon layer was separated and washed again with ice water. By careful distillation of the product, there was obtained 36.7 grams of the dimethyl ester of perfluoro-2-methyl-3-oxaglutaric acid, having a boiling point of 91° C. at 20 mm./mercury (45% yield). NMR and IR spectra were consistent with the assigned structure. The above formed dimethyl ester was converted quantitatively to the diamide of perfluoro-2-methyl-3-oxaglutaric acid which has a melting point of 147 to 148° C., by passing ammonia through the solution of the ester in diethyl ether at room temperature. The amide was dried over phosphorus pentoxide in a vacuum desiccator. A slurry of 20 grams of the diamide in 100 ml. trichlorobenzene was slowly added to a stirred solution of 300 grams of benzotrichloride in 300 ml. trichlorobenzene at 210° C. The low boiling dinitrile was collected in a Dry Ice trap and purified by passage through a preparatory gas chromatography column. After purification, a 30% yield of perfluoro-2,4-dicyano-3-oxabutane was obtained. NMR and IR spectra were consistent with the assigned structure.

*Example 3*

2,7-dicarbomethoxyperfluoro-3,6-dioxaoctane was prepared in 98% yield by treatment of the corresponding diacid fluoride with methanol at room temperature. The ester boiled at 101° C. at 20 mm./mercury pressure. The solid diamide was prepared by passing anhydrous ammonia through a 50–50 mixture of 2,7-dicarbomethoxyperfluoro-3,6-dioxaoctane in diethyl ether at room temperature. Dehydration of the crude diamide was accomplished by mixing 150 grams of the amide and 700 grams of phosphorus pentoxide and heating to 180 to 200° C. for two hours. The crude product, perfluoro-2,7-dicyano-3,6-dioxaoctane, was obtained in 85% yield. Distillation gave pure dinitrile, boiling at 96.5° C. at 760 mm./mercury. NMR and IR spectra were consistent with the assigned structure.

*Example 4*

2,10 - dicarbomethoxyperfluoro-3,9-dioxaundecane was prepared by treatment of the corresponding acid difluoride with methanol at room temperature. The diester was obtained in 98% yield and boiled at 122° C. at 10 mm./mercury pressure. Treatment with ammonia by passing anhydrous ammonia through a 50–50 mixture of 2,10-dicarbomethoxyperfluoro - 3,9 - dioxaundecane in diethyl ether at room temperature gave the corresponding diamide in 85% yield, which diamide had a melting point of from 116–120° C. Dehydration of the diamide was accomplished in vacuum over phosphorus pentoxide. The dinitrile, perfluoro-2,10-dicyano - 3,9 - dioxaundecane was obtained in 90% conversion and boiled at 146° C. NMR and IR spectra were consistent with the assigned structure.

*Example 5*

This example relates to the preparation of long chain dinitriles from tetrafluoroethylene oxide. Into a dry flask containing 250 mg. of tetraethylammonium cyanide and 15 ml. of $CHF_2CF_2CH_2Cl$ at −35° C. was added 34 grams (0.14 mole) of perfluoroglutaryl fluoride. Tetrafluoroethylene oxide, 66 grams (0.57 mole) was slowly added to the flask at 10 to 15 p.s.i. over a 1.5 hour period. Stirring of the reaction mixture for an additional hour gave complete reaction of the epoxide as evidenced by the drop in pressure to −22″ mercury vacuum. Titration of an aliquot of the reaction mixture with base gave an average molecular weight value of 660. The theoretical molecular weight for $$OCFCF_2OCF_2CF_2O-(CF_2)_5-OCF_2CF_2OCF_2COF$$

is 708. The entire reaction mixture was esterified with 100 ml. of methanol, filtered through a short silica gel column to remove HF, and distilled.

Distillation gave:

(A) 4.2 ml., B.P. 70–133° C./26 mm./Hg.
(B) 16 ml., B.P. 134–145° C./26 mm./Hg.
(C) 10.6 ml., B.P. 144–154° C./26 mm./Hg.
(D) 26 ml., B.P. 92–108° C./1 mm./Hg.

Additional purification of the distillation cuts by preparative vapor phase chromatography gave analytically pure material.

Fraction:

(A) *Analysis.*—Calculated for $C_{11}H_6F_{14}O_6$, mol. wt. 500.2: C, 26.4; H, 1.2; F, 53.2. Found: C, 27.8; H, 1.18; F, 52.96; mol. wt. by N.E. (neutralization equivalent), 496.

(B) *Analysis.*—Calculated for $C_{13}H_6F_{18}O_7$, mol. wt. 616.2: C, 25.3; H, 0.97; F, 55.5. Found: C, 24.81; H, 0.86; F, 55.16; mol. wt. by N.E., 604.

(C) *Analysis.*—Calculated for $C_{15}H_6F_{22}O_8$, mol. wt. 732.2: C, 24.5; H, 0.82; F, 57.3. Found: C, 24.38; H, 0.72; F, 54.94; mol. wt. by N.E., 754.

The mixture of dimethyl esters (86 g.) was dissolved in 100 ml. of diethyl ether and reacted with ammonia gas at 10 p.s.i. and 0° C. After stirring for 15 hours, the excess ammonia and diethyl ether were evaporated under vacuum to leave 76 grams of solid diamide, a mixture of

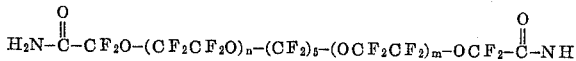

where $n$ and $m$ are equal to 0, 1, 2, and 3 and the sum of $n$ and $m$ had an average value of 2, together with

where $p$ had an average value of 3. The mixture of amides (72 g.) was ground to a fine powder and blended with 216 grams of $P_2O_5$ in a 500 ml. flask. After the flask was heated in an oil bath at 160° C. for 1 hour, the dinitrile was removed by vacuum distillation while the oil bath temperature was slowly raised to 200° C. The 39 ml., 62 g. of dinitrile isolated contained no detectable amide by IR analysis.

Distillation of the dinitrile gave fraction:

(A) 3.1 g., B.P. 110–130° C./760 mm./Hg.
(B) 15 g., B.P. 132–158° C./760 mm./Hg largely $C_9F_{14}O_2N_2$ by vapor phase chromatography.
(C) 17.4 g., B.P. 160–184° C./760 mm./Hg largely $C_{11}F_{18}O_3N_2$ by V.P.C.
(D) 21.7 g., B.P. 186–220° C./760 mm./Hg mixture of $C_{13}F_{22}O_4N_2$ and $C_{15}F_{26}O_5N_2$.

Analyses by V.P.C., I.R. and NMR indicated that the distilled fractions were mixtures of the isomers

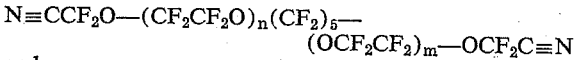
and
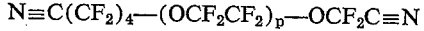

Fraction:

(A) *Analysis.*—Calculated for $C_9F_{14}O_2N_2$: C, 24.90; F, 61.27; N, 6.45. Found: C, 24.63; F, 62.4; N, 5.44.
(B) *Analysis.*—Calculated for $C_{11}F_{18}O_3N_2$: C, 24.02; F, 62.2; N, 5.09. Found: C, 24.01; F, 62.17; N, 4.78.

(C) *Analysis.*—Calculated for $C_{13}F_{22}O_4N_2$: C, 23.44; F, 62.78; N, 4.21. Found: C, 23.66; F, 62.40; N, 3.76.
(D) *Analysis.*—Calculated for $C_{15}F_{26}O_5N_2$: C, 23.03; F, 63.16; N, 3.58. Found: C, 23.95; F, 63.56; N, 3.45.

Example 6

Fifty grams (0.2 mole) of perfluoroglutaryl fluoride was added to a dry flask containing 0.4 gram of tetraethylammonium cyanide and 20 ml. of $CHF_2CF_2CH_2Cl$ at −35° C. Into the vigorously stirred mixture, kept at −35 to −18° C. was added tetrafluoroethylene oxide at 15 p.s.i. for 3 hours (184 grams, 1.58 moles). Complete reaction of the epoxide was evident by the rapid drop in pressure to −15 inches mercury vacuum. The fluorocarbon product was heated to remove the 20 ml. of volatile solvent leaving 233 grams of high boiling oil having an IR spectra consistent with the structure

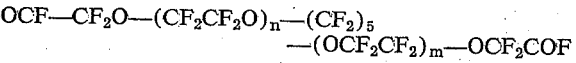

The 233 grams of diacylfluoride was combined with 168 grams of similar material and added slowly over a 1 hour period to 300 ml. of diethyl ether at 0° C. continuously saturated with ammonia gas. The homogeneous solution of diamide in ammonia-saturated diethyl ether was stirred for an additional hour at 25° C. to complete the reaction. Evaporation of the ether and ammonia under vacuum left 431 grams of diamide containing a small amount of ammonium bifluoride. The 431 grams of diamide was blended with 750 grams of phosphorus pentoxide and heated in an oil bath at 100 to 180° C. for 1 hour. The temperature of the bath was slowly increased to 280° C. over a 1 hour period while the dinitrile was removed under 1 mm./Hg vacuum. The yield of product collected was 204 ml., 342 grams.

Distillation gave:

20 ml., B.P. 48° C./100 mm./Hg to 143° C./100 mm./Hg
18 ml., B.P. 143° C./100 mm./Hg to 150° C./100 mm./Hg
30 ml., B.P. 68° C./1.0 mm./Hg to 80° C./0.5 mm./Hg
74.5 ml., B.P. 80° C./0.5 mm./Hg to 89° C./0.03 mm./Hg
25 ml., B.P. 90° C./0.03 mm./Hg to 98° C./0.03 mm./Hg
15 ml., B.P. 98° C./0.03 mm./Hg to 104° C./0.03 mm./Hg

Analysis of the fractions by IR, VPC, and NMR confirmed the presence of the structures

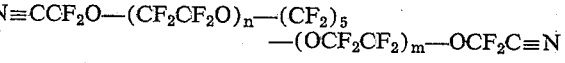

where $n$ and $m$ were integers selected from the group consisting of 0, 1, 2, 3, 4, 5, 6, 7, and 8 and where $n$ plus $m$ had an average value of 6 and $$N\equiv C-(CF_2)_4-(OCF_2CF_2)_p-OCF_2C\equiv N$$

where $p$ had an average value of 7.

Table I reports the formation of various oxygen-containing polymers and the properties thereof. In Table I, the monomers used are referred to by code letters which code is as follows: "A" is perfluoro-2,4-dicyano-3-oxabutane, "B" is perfluoro-2,7-dicyano-3,6-dioxaoctane, "C" is perfluoro-2,7-dicyano-3-oxaheptane, "D" is perfluoro-2,10-dicyano-3,9-dioxaundecane, "E" is perfluoroglutaronitrile, "F" is perfluoroadiponitrile, "G" is

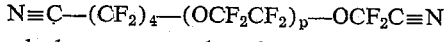

$m$ plus $n$ equals a mixture from 4 to 9 with major components having $n+m=6.7$. "H" is perfluorosuberonitrile, and "I" is perfluorosuccinodinitrile.

The polymerization procedures used in Table I are as follows:

"A." The dinitrile is condensed into a heavy walled glass tube which is sealed at the bottom. The desired amount of ammonia is condensed into the tube. The tube is cooled to liquid nitrogen temperature evacuated and sealed. The amount of ammonia added may vary from 0.2% to 20% (mole percent based on dinitrile), the preferred range being from 1–10% ammonia. The reaction tube is filled with dinitrile in such manner that a minimum of free space will exist at the reaction temperature. The average expansion of these nitriles is about 2 volume percent per 10° C. temperature rise. The sealed tube containing the dinitrile and ammonia is then heated to 160° C. for 24 hours after which the temperature is raised to 250° C. for 48 hours at which point the reaction is complete and the polymer is removed from the reaction tube.

"B." A procedure similar to procedure "A" is used except that a mixture of different dinitriles is used. This mixture may be binary in any proportion, ternary or quaternary.

"C." A small quantity of dinitrile is introduced into a heavy walled glass tube which is sealed at the bottom.

as perfluoroacetonitrile or perfluoro-2-propoxypropionitrile was used for amidine conversion.

"F." A procedure similar to "E" is used except that the nitriles used for the main body of the polymer and amidine formation are used in the proportion given in both cases.

"G." A procedure similar to "F" is used in which the nitrile for the amidine formation has an oxygen-containing chain. Using this class of compounds results in the special advantage that the resultant amidine is a liquid and very soluble in the nitriles used for polymer formation.

In Table I, the heat distortion temperature was measured in accordance with ASTM–D–648–56 (264 p.s.i.) and the flexural modulus was measured in accordance with ASTM–D–790–59T.

The homopolymers of the dinitriles of perfluorodicarboxylic acids produced in accordance with Table I are considered not preferred and outside the scope of this invention due to their low strength and brittleness.

TABLE I

| Ex. | Composition | | | | Method of preparation | Mole percent ammonia | Appearance | Thermal stability, wt. percent loss/hr. at 300° C. | Tensile strength, p.s.i. | Average number atoms between triazine rings | Heat distortion temp., °C. (264 p.s.i.) | Flex modulus, p.s.i.×10⁻³ |
|---|---|---|---|---|---|---|---|---|---|---|---|---|
| | Mole percent | Compound | Mole percent | Compound | | | | | | | | |
| 7 | 100 | A | | | A | 3 | Brown | | | 3 | | |
| 8 | 100 | B | | | A | 3 | Clear, tough | 0.0132 | | 6 | 60 | 244 |
| 9 | 100 | D | | | A | 3 | Clear, flexible | 0.119 | | 9 | 0–2 | Low |
| 10 | 100 | E | | | A | 3 | Brown, brittle | 0.0274 | | 3 | 150 | 248 |
| 11 | 100 | F | | | A | 3 | do | 0.0167 | | 4 | 98 | 194 |
| 12 | 100 | G | | | A | 3 | Clear, rubbery | 0.164 | | 20 | 0 | Low |
| 13 | 100 | C | | | A | 0.5 | do | | | 6 | | |
| 14 | 100 | C | | | A | 1 | do | | | 6 | | |
| 15 | 100 | C | | | A | 3 | Clear, tough | 0.0212 | | 6 | 60 | 195 |
| 16 | 100 | C | | | A | 6 | do | | | 6 | 60 | |
| 17 | 100 | C | | | A | 10 | do | | | 6 | 60 | |
| 18 | 80 | G | 20 | C | B | 3 | Clear, flexible | 0.382 | | 17.2 | 25 | 155 |
| 19 | 80 | G | 20 | D | B | 3 | do | 0.408 | | 17.8 | 25 | 166 |
| 20 | 80 | G | 20 | F | B | 3 | do | 0.21 | | 16.8 | 25 | 170 |
| 21 | 95 | E | 5 | B | D | 3 | Brown, tough | | | 3.15 | | 241 |
| 22 | 95 | E | 5 | C | D | 3 | do | | | 3.15 | | 231 |
| 23 | 50 | E | 50 | B | F | 3 | do | | | 4.5 | | 232 |
| 24 | 50 | E | 50 | C | F | 3 | do | | | 4.5 | | 189 |
| 25 | 50 | E | 50 | D | F | 3 | do | | | 6 | | 158 |
| 26 | 99 | I | 1 | B | G | 3 | Clear, light yellow | | 9,900 | 2.04 | 235 | 487 |
| 27 | 97 | I | 3 | G | G | 3 | Tough | | 6,950 | 2.54 | 175 | |
| 28 | 97 | I | 3 | H | E | 3 | do | | | 2.12 | 235 | 450 |
| 29 | 95 | I | 5 | B | G | 3 | do | .013 | 10,500 | 2.20 | 230 | 436 |
| 30 | 95 | I | 5 | C | D | 3 | do | | 5,290 | 2.20 | 230 | 398 |
| 31 | 95 | I | 5 | D | G | 3 | do | | | 2.35 | 210 | 364 |
| 32 | 95 | I | 5 | G | G | 3 | do | | | 2.90 | | 179 |
| 33 | 90 | I | 10 | B | G | 3 | do | | | 2.40 | 210 | |
| 34 | 90 | I | 10 | F | D | 3 | Clear, amber, tough | | 7,230 | 2.20 | 223 | 417 |
| 35 | 80 | I | 20 | B | G | 3 | Clear, light yellow | | 5,100 | 2.80 | | 376 |
| 36 | 80 | I | 20 | C | G | 3 | Tough | | 5,240 | 2.80 | 157 | 329 |
| 37 | 80 | I | 20 | D | G | 3 | do | | | 3.40 | 102 | 273 |
| 38 | 80 | I | 20 | H | E | 3 | do | | | 2.80 | 153 | 315 |
| 39 | 80 | I | 20 | E | G | 3 | do | | | 2.2 | 230 | 402 |
| 40 | 50 | I | 50 | B | G | 3 | do | | | 4.0 | | |
| 41 | 50 | I | 50 | C | G | 3 | do | | | 4.0 | 100 | 243 |
| 42 | 50 | I | 50 | D | G | 3 | do | | | 5.5 | 52 | 185 |

The tube is cooled to −40° C. and an excess of ammonia is condensed in. During a period of two hours at −40° C., the ammonia reacts with all of the available dinitrile to form a diamidine. Excess ammonia is then removed and further dinitrile added. The quantities are made up in such a way that the diamidine forms from 0.5 to 10 mole percent of the total mixture. The tube is then cooled to liquid nitrogen temperature, evacuated and sealed. The sealed tube is then heated to 160° C. for 24 hours after which the temperature is raised to 250° C. for 48 hours.

"D." A procedure similar to case "C" is used except that the dinitrile used for amidine formation is different from the dinitrile forming the main body of the polymer. The dinitrile used in smaller quantity in Table I is the one used for amidine formation in each case.

"E." A procedure similar to procedure "D" is used in which 0.5–30 mole percent (based on the total dinitrile composition) of a monofunctional perfluoronitrile such Examples 43 to 45 illustrate the conversion of a mixture of dinitriles to a prepolymer syrup in a closed container followed by set up of this syrup to a thermosetting resin in an open container.

*Example 43*

In a small glass tube sealed at one end is placed 1½ parts of the diamidine of perfluoro-2,7-dicyano-3,6-dioxaoctane. There is then added 8½ parts of perfluoro-2,7-dicyano-3,6-dioxaoctane mixed with 90 parts of perfluorosuccinodinitrile. The tube is cooled to liquid nitrogen temperature, evacuated and sealed. It is then heated for 18 hours at 145° C. followed by 2 hours at 190° C. The tube is opened and the viscous prepolymer is cured in a mold exposed to the air at 200° C. for 24 hours. A hard thermoset resin casting is obtained by this process.

*Example 44*

In a glass tube sealed at one end is placed 1½ part of the diamidine of perfluoro-2,7-dicyano-3,6-dioxaoctane, 18½ parts of perfluoro-2,7-dicyano-3,6-dioxaoctane and 80 parts of perfluorosuccinodinitrile. The tube is cooled to liquid nitrogen temperature, evacuated and sealed. The tube and reaction mixture is then heated for 12 hours at 145° C. followed by 6 hours at 185° C. The viscous syrup is removed from the tube and heated for 24 hours at 200° C. in an air-oven followed by 60 hours at 300° C. in an air-oven. There is thus obtained a hard thermosetting resin having the same properties as a similar composition prepared in the absence of air.

*Example 45*

In a glass tube sealed at one end is placed 86 parts of perfluoro-2,4-dicyano-3-oxabutane and 14 parts of a long chain dinitrile of the structure $$NCCF_2(OCF_2CF_2)_nO(CF_2)_5O(CF_2CF_2O)_mCF_2CN$$

where $m$ plus $n$ is a mixture from 4 to 9 with major components having $m$ plus $n$ equalling 6 and 7. The tube is cooled to liquid nitrogen temperature, evacuated and ammonia equivalent to 3 mole percent of the mixed dinitriles is added. The tube is sealed and placed in a bath at 200° C. for 60 hours. The viscous liquid prepolymer is removed from the tube and heated for 50 hours at 200° C. in a mold. There is thus obtained a hard thermosetting resin.

*Example 46*

To a 4 mm. inside diameter glass polymer tube containing 1.0 gram of $C_9F_{14}O_2N_2$ dinitrile was added $2.4 \times 10^{-5}$ moles of ammonia gas (1 mole percent). The tube was sealed and heated in an oil bath at 200° C.–260° C. for 88 hours. The dinitrile was quantitatively converted to a clear, colorless polytriazine resin. Analysis by IR detected no residual nitrile, amide, nor amidine absorption peaks but did show a very strong triazine band at 6.55 microns. This resin retained its clarity and high elasticity during 72 hours of heating at 400° C. However, this resin did commence to degrade at 520° C. in a standard thermogravimetric analysis test.

The resins produced in accordance with this invention couple high temperature resistance, excellent chemical resistance, especially to acids, and good electrical insulation properties with physical strength characteristics adequate for all but the most strennuous applications. The resins of Examples 8–41 and 45 are all suitable for use as thermosetting molding powders for molding furnace parts, such as hinges, doors, or walls and forming wire jackets and electrical boxes for use on furnaces or in other high temperature applications. The prepolymer syrups produced in Examples 42–44 are useful for casting objects having the uses hereinabove set forth and further are useful as tank lining materials and for impregnating glass fabrics which can be used to form furnace walls and other high temperature resistant structural members with high strength to weight ratios.

*Example 47*

Into a cavity mold 6" wide x 12" long x ¼ inch deep was placed a glass fiber bat. The prepolymer syrup of Example 43 was then flowed over the bat to fill the cavity and the mold heated at 200° C. for 24 hours in a hot air oven.

The resulting laminate was strong, of good appearance, and was resistant to heating at 300° C. for long periods of time.

We claim:

1. A solid polymer resin having recurring triazine rings linked from the carbon atoms with at least 1 weight percent of a perfluorocarbon ether having a structure selected from the group consisting of (A) $-(CF_2)_nCF_2OCF-$
           $\phantom{-(CF_2)_nCF_2OC}|$
           $\phantom{-(CF_2)_nCF_2OC}X$ where $n$ is an integer of from 0 to 12, and X is selected from the group consisting of F and $CF_3$;

(B) 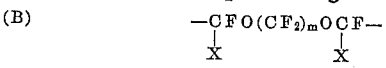

where $m$ is an integer of from 2 to 12 and X is selected from the group consisting of F and $CF_3$;

(C) 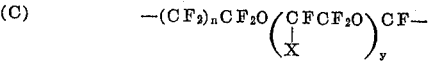

where $n$ is an integer of from 0 to 12, $y$ is an integer of from 0 to 100, and X is selected from the group consisting of F and $CF_3$; and (D) 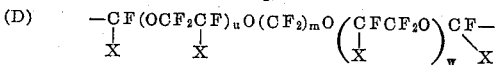

where $m$ is an integer of from 2 to 12, $w$ plus $u$ is an integer of from 0 to 100 and X is selected from the group consisting of F and $CF_3$, the remainder of said triazine ring links being divalent perfluorocarbon radicals containing from 2 to 8 carbon atoms.

2. A solid polymer resin having recurring triazine rings linked from the carbon atoms by at least 1 weight percent of a perfluorocarbon ether having the structure

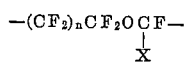

where $n$ is an integer of from 0 to 12, and X is selected from the group consisting of F and $CF_3$, the remainder of said triazine ring links being divalent perfluorocarbon radicals containing from 2 to 8 carbon atoms.

3. A solid polymer resin having recurring triazine rings linked from the carbon atoms by at least 1 weight percent of a perfluorocarbon ether having the structure

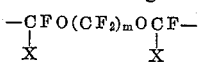

where $m$ is an integer of from 2 to 12 and X is selected from the group consisting of F and $CF_3$, the remainder of said triazine ring links being divalent perfluorocarbon radicals containing from 2 to 8 carbon atoms.

4. A solid polymer resin having recurring triazine rings linked from the carbon atoms by at least 1 weight percent of a perfluorocarbon ether having the structure

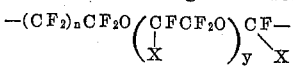

where $n$ is an integer of from 0 to 12, $y$ is an integer of from 0 to 100, and X is selected from the group consisting of F and $CF_3$, the remainder of triazine ring links being perfluorocarbon radicals containing from 2 to 8 carbon atoms.

5. A solid polymer resin having recurring triazine rings linked from the carbon atoms by at least 1 weight percent of a structure

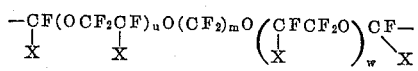

where $m$ is an integer of from 2 to 12, and $w$ plus $u$ is an integer of from 0 to 100 and X is selected from the group consisting of fluorine and $CF_3$, the remainder of said triazine ring links being divalent perfluorocarbon radicals containing from 2 to 8 carbon atoms.

6. A solid polymer resin having recurring triazine rings linked from the carbon atoms with links consisting essentially of perfluorocarbon ether links between said triazine rings said perfluorocarbon ether links having a structure selected from the group consisting of:

(A) 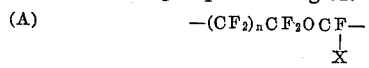

where $n$ is an integer of from 0 to 12 and X is selected from the group consisting of F and $CF_3$;

(B) 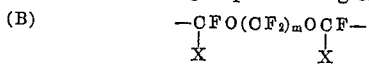

where *m* is an integer of from 2 to 12 and X is selected from the group consisting of F and CF₃;

(C) 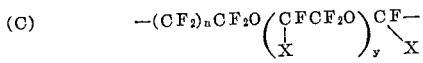

where *n* is an integer of from 0 to 12, *y* is an integer of from 0 to 100, and X is selected from the group consisting of F and CF₃; and (D) 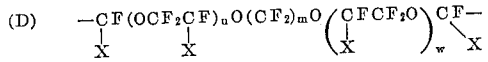

where *m* is an integer of from 2 to 12, *u* plus *w* is an integer of from 0 to 100 and X is selected from the group consisting of F and CF₃.

7. A solid polymer resin having recurring triazine rings linked from the carbon atoms with links consisting essentially of perfluorocarbon ether links between said triazine rings having the structure

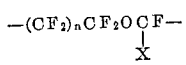

wherein X is selected from the group consisting of F and CF₃ and *n* is an integer of from 0 to 12.

8. A solid polymer resin having recurring triazine rings linked from the carbon atoms with links consisting essentially of perfluorocarbon ether links between said triazine rings having the structure

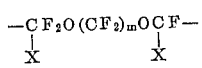

wherein X is selected from the group consisting of F and CF₃, and *m* is an integer of from 2 to 12.

9. A solid polymer resin having recurring triazine rings linked from the carbon atoms with links consisting essentially of perfluorocarbon ether links between said triazine rings having the structure

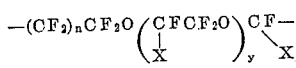

where *n* is an integer of from 0 to 12, *y* is an integer of from 0 to 100, and X is selected from the group consisting of F and CF₃.

10. A solid polymer resin having recurring triazine rings linked from the carbon atoms with links consisting essentially of perfluorocarbon ether links between said triazine rings the structure

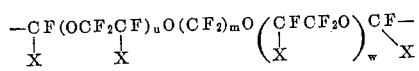

where *m* is an integer of from 2 to 12, *u* plus *w* is an integer of from 0 to 100 and X is selected from the group consisting of F and CF₃.

11. A shaped article formed of the polymer of claim 1.

12. A glass fiber reinforced article formed of the polymer of claim 1.

13. A solid copolymer resin having recurring triazine rings linked from the carbon atoms and formed of from 1 to 20 percent a perfluorodinitrile containing from 5 to 8 carbon atoms and the remainder of said polymer consisting essentially of perfluorosuccinodinitrile.

14. The copolymer of claim 13 wherein the perfluorodinitrile comprising from 1 to 20 percent of the polymer is perfluoroglutarodinitrile.

15. The copolymer of claim 13 wherein the perfluorodinitrile comprising from 1 to 20 percent of the polymer is perfluoroadipodinitrile.

16. The copolymer of claim 13 wherein the perfluorodinitrile comprising from 1 to 20 percent of the polymer is perfluoroctanodinitrile.

17. A solid copolymer resin having recurring triazine rings linked from the carbon atoms and formed of from 1 to 20 percent of a perfluoroether dinitrile having a structure selected from the group consisting of:

(A) 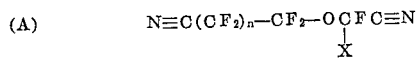

where *n* is an integer of from 0 to 12 and X is selected from the group consisting of F and CF₃;

(B) 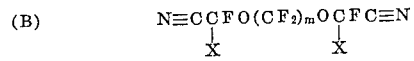

where *m* is an integer of from 2 to 12 and X is selected from the group consisting of F and CF₃;

(C) 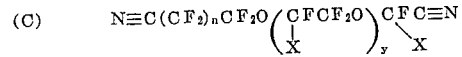

where *n* is an integer of from 0 to 12, *y* is an integer of from 0 to 100, and X is selected from the group consisting of F and CF₃; and (D) 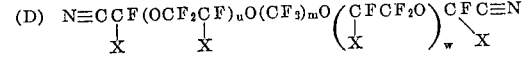

where *m* is an integer of from 2 to 12 and *u* plus *w* is an integer of from 0 to 100, and X is selected from the group consisting of F and CF₃ and the remainder of said copolymer consisting essentially of perfluorosuccinodinitrile.

18. The copolymer of claim 17 wherein the perfluoroether dinitrile has the structure

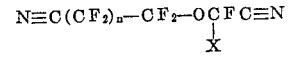

where *n* is an integer of from 0 to 12 and X is selected from the group consisting of F and CF₃.

19. The copolymer of claim 17 wherein the perfluoroether dinitrile has the structure

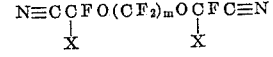

where *m* is an integer of from 2 to 12 and X is selected from the group consisting of F and CF₃.

20. The copolymer of claim 17 wherein the perfluoroether dinitrile has the structure

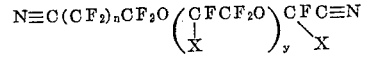

where *n* is an integer of from 0 to 12, *y* is an integer from 0 to 100, and X is selected from the group consisting of F and CF₃.

21. The copolymer of claim 17 wherein the perfluoroether dinitrile has the structure

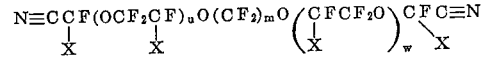

where *m* is an integer of from 2 to 12, and *u* plus *w* is an integer of from 0 to 100 and X is selected from the group consisting of F and CF₃.

22. A solid copolymer resin having recurring triazine rings linked from the carbon atoms and formed of from 1 to 20 percent of a perfluoroether dinitrile having a structure selected from the group consisting of:

(A) 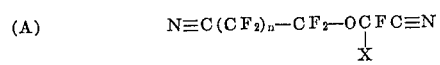

where *n* is an integer of from 0 to 12 and X is selected from the group consisting of F and CF₃;

(B) 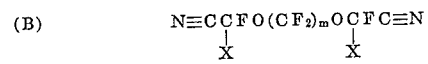

where *m* is an integer of from 2 to 12 and X is selected from the group consisting of F and CF₃;

(C) 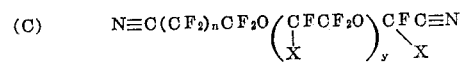

an integer of from 0 to 12, $y$ is an integer of from 0 to 100, and X is selected from the group consisting of F and $CF_3$;

(D) 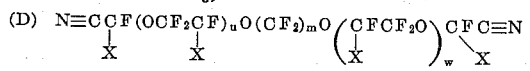

where $m$ is an integer of from 2 to 12 and $u$ plus $w$ is an integer of from 0 to 100, and X is selected from the group consisting of F and $CF_3$; and (E) dinitriles containing from 5 to 8 carbon atoms and the remainder of said copolymer consisting essentially of perfluorosuccinodinitrile.

References Cited by the Examiner
UNITED STATES PATENTS

| | | | |
|---|---|---|---|
| 2,500,942 | 3/1950 | Hager | 260—465.6 |
| 2,592,301 | 4/1952 | Linville | 260—78.4 |
| 2,765,333 | 9/1956 | Lane | 260—465.6 |
| 3,092,611 | 6/1963 | Lynn | 260—78.4 |

JOSEPH L. SCHOFER, *Primary Examiner.*

JAMES A. SEIDLECK, *Examiner.*

L. WOLF, L. G. CHILDERS, *Assistant Examiners.*